United States Patent
Hohenshelt

(10) Patent No.: US 10,350,801 B2
(45) Date of Patent: Jul. 16, 2019

(54) SYSTEM AND METHOD FOR PRODUCTION OF CUSTOMIZED FOOD AND BEVERAGE COOLERS

(71) Applicant: Taiga Coolers, LLC, Arlington, TX (US)

(72) Inventor: John S. Hohenshelt, Arlington, TX (US)

(73) Assignee: Taiga Coolers, LLC, Arlington, TX (US)

( * ) Notice: Subject to any disclaimer, the term of this patent is extended or adjusted under 35 U.S.C. 154(b) by 247 days.

(21) Appl. No.: 14/982,836

(22) Filed: Dec. 29, 2015

(65) Prior Publication Data

US 2017/0144348 A1   May 25, 2017

Related U.S. Application Data

(60) Provisional application No. 62/260,002, filed on Nov. 25, 2015.

(51) Int. Cl.
| | |
|---|---|
| *B29C 45/26* | (2006.01) |
| *B29C 45/37* | (2006.01) |
| *B29L 31/00* | (2006.01) |

(52) U.S. Cl.
CPC .......... *B29C 45/2675* (2013.01); *B29C 45/37* (2013.01); *B29C 45/372* (2013.01); *B29L 2031/712* (2013.01)

(58) Field of Classification Search
CPC ............ B29C 45/2675; B29C 45/2673; B29C 45/177; B29C 45/372; B29C 45/374;
(Continued)

(56) References Cited

U.S. PATENT DOCUMENTS 1,559,394 A * 10/1925 Williams .................. C03B 9/32
  249/103
2,601,700 A *  7/1952 Pinsky ..................... B29C 49/52
  101/125

(Continued)

FOREIGN PATENT DOCUMENTS

| DE | 102011007997 B4 * | 1/2016 | ........... B22D 17/229 |
| GB | 2304621 B * | 11/1999 | ........... B29C 33/306 |

OTHER PUBLICATIONS

Johnson, Steven. "Determining Maximum Mold Cycle Counts." Plastics Technology, Plastics Technology, May 31, 2010, www.ptonline.com/columns/determining-maximum-mold-cycle-counts(2).*

(Continued)

*Primary Examiner* — Seyed Masoud Malekzadeh
*Assistant Examiner* — Taryn Trace Willett
(74) *Attorney, Agent, or Firm* — Scott T. Griggs; Griggs Bergen LLP

(57) ABSTRACT

A system and method for production of a customizable food and beverage cooler are disclosed. In one embodiment of the system, a mold includes two primary halves configured to produce an injection molded part that is a component of the food and beverage cooler. An aperture intersects one of the primary halves of the mold to accommodate an insertion block that includes a reverse image thereon such that molten plastic flow around the reverse image produces an integrally molded image on the component of the food and beverage cooler. Further, the aperture accommodates a combination insertion block and insertion plate having the reverse image thereon. One of the insertion block or combination insertion block and insertion plate is selected for disposing in the aperture based on the desired production run of the injection molded part.

19 Claims, 5 Drawing Sheets

(58) Field of Classification Search
CPC .... B29C 2045/2677; B29C 2045/2679; B29C 2045/2604; B29C 45/03; B29C 45/04; B29C 45/10; B29C 45/12; B29C 45/17; B29C 45/1742; B29C 45/1743; B29C 45/1751; B29C 45/2602; B29C 45/2624; B29C 45/37; B29C 45/376
See application file for complete search history.

(56) References Cited

U.S. PATENT DOCUMENTS

| | | | |
|---|---|---|---|
| 3,061,880 A * | 11/1962 | Weisbach | A63H 33/001 249/104 |
| 3,734,448 A * | 5/1973 | Rusk | B41B 11/00 164/229 |
| 3,861,640 A * | 1/1975 | Agneta | B29C 33/306 249/102 |
| 3,989,220 A * | 11/1976 | Greenberg | B29C 39/00 220/4.21 |
| 4,473,346 A | 9/1984 | Hehl | |
| 4,544,340 A | 10/1985 | Hehl | |
| 4,861,254 A * | 8/1989 | Takeuchi | B29C 45/2673 249/102 |
| 4,979,720 A * | 12/1990 | Robinson | A23G 1/226 249/103 |
| 5,451,156 A * | 9/1995 | Roncelli | B29C 45/2673 249/67 |
| 5,595,771 A * | 1/1997 | Foltuz | B29C 45/2673 264/318 |
| 5,597,593 A * | 1/1997 | Lebensfeld | B29C 33/30 249/105 |
| 5,736,168 A * | 4/1998 | Goyal | B29C 33/306 249/102 |
| 5,750,161 A | 5/1998 | Schock, Jr. et al. | |
| 5,964,274 A * | 10/1999 | Brinkley | B29C 45/2673 164/312 |
| 6,007,759 A | 12/1999 | Ten Tije et al. | |
| 6,572,356 B2 | 6/2003 | Seger | |
| 7,628,597 B2 | 12/2009 | Teensma et al. | |
| 7,837,455 B2 * | 11/2010 | Cerwin | A61B 17/06133 249/102 |
| 7,866,972 B2 * | 1/2011 | Kuo | B29C 45/2673 425/185 |
| 8,057,210 B2 | 11/2011 | Clark | |
| 8,485,809 B2 | 7/2013 | Dagorn et al. | |
| 8,616,869 B2 | 12/2013 | Houdeshell et al. | |
| 8,864,484 B2 | 10/2014 | Beck | |
| 2002/0090409 A1 | 7/2002 | Seger | |
| 2003/0072834 A1 * | 4/2003 | Wang | B29C 45/2673 425/190 |
| 2008/0173786 A1 * | 7/2008 | Chen | B29C 45/2675 249/102 |
| 2008/0290248 A1 * | 11/2008 | Yang | B29C 45/374 249/103 |
| 2009/0218356 A1 * | 9/2009 | Colacitti | B29C 45/14 220/574 |
| 2010/0283182 A1 * | 11/2010 | Maatta | B29C 45/14262 264/266 |
| 2011/0115117 A1 * | 5/2011 | Desmith | B29C 33/306 264/219 |
| 2012/0040327 A1 * | 2/2012 | Kohl | B29C 45/2673 434/365 |
| 2015/0158219 A1 * | 6/2015 | Nordmann | B29C 45/14688 264/571 |
| 2018/0065286 A1 * | 3/2018 | Pruitt | B29C 67/246 |

OTHER PUBLICATIONS

Iceberg Cooler Co. "Iceberg Cooler Details." Wayback Machine generated NPL, Jan. 6, 2013, http://www.icebergcooleroo.com:80/aboutus/coolerdetails.html.*
Ivory, Rena. "Blog." Understand Common Steels Used in Injection Mold Making, Crescent Industries, Inc., Jul. 10, 2013, info.crescentind.com/blog/bid/66085/Understand-Common-Steels-Used-in-Injection-Mold-Making.*

* cited by examiner

SYSTEM AND METHOD FOR PRODUCTION OF CUSTOMIZED FOOD AND BEVERAGE COOLERS

PRIORITY STATEMENT & CROSS-REFERENCE TO RELATED APPLICATIONS

This application claims priority from U.S. Patent Application No. 62/260,002, entitled "System and Method for Production of Customized Food and Beverage Coolers" and filed on Nov. 25, 2015, in the name of John S. Hohenshelt; which is hereby incorporated by reference for all purposes.

TECHNICAL FIELD OF THE INVENTION

This invention relates, in general, to the production of food and beverage coolers and, more particularly, to a system and method for the production of customized food and beverage coolers, which shapes a fluent or bulk material having plasticity into a self-sustaining article with customizable presentation.

BACKGROUND OF THE INVENTION

In the production of custom articles or parts, such as parts produced by injection molding, it is frequently necessary to change the large and heavy tools or molds within the injection molding press in order to produce different parts. Since the molds are normally positioned on and secured to a platen of the press with bolts and/or clamps with bolts, it is necessary to remove each of the bolts and/or clamps and then manually slide the mold onto the forks of a forklift truck for transporting the mold to a storage location or rack. During this period, the press is not operating. Therefore, improvements are needed in injection molding that allow for dynamic interchangeability of molds to minimize downtime of the injection molding operation.

SUMMARY OF THE INVENTION

It would be advantageous to achieve a system and method for dynamically interchanging molds during an injection molding operation, such as the production of food and beverage coolers, that would minimize downtime. It would also be desirable to enable a mechanical solution that would address this problem, and particularly issues with customization, by permitting small runs of customizable product. To better address one or more of these concerns, a system and method for production of a customizable food and beverage cooler are disclosed. In one embodiment of the system, a mold includes two primary halves configured to produce an injection molded part that is a component of the food and beverage cooler. An aperture intersects one of the primary halves of the mold to accommodate an insertion block that includes a reverse image thereon such that molten plastic flow around the reverse image produces an integrally molded image on the component of the food and beverage cooler. Further, the aperture accommodates a combination insertion block and insertion plate having the reverse image thereon. One of the insertion block or combination insertion block and insertion plate is selected for disposing in the aperture based on the desired production run of the injection molded part. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
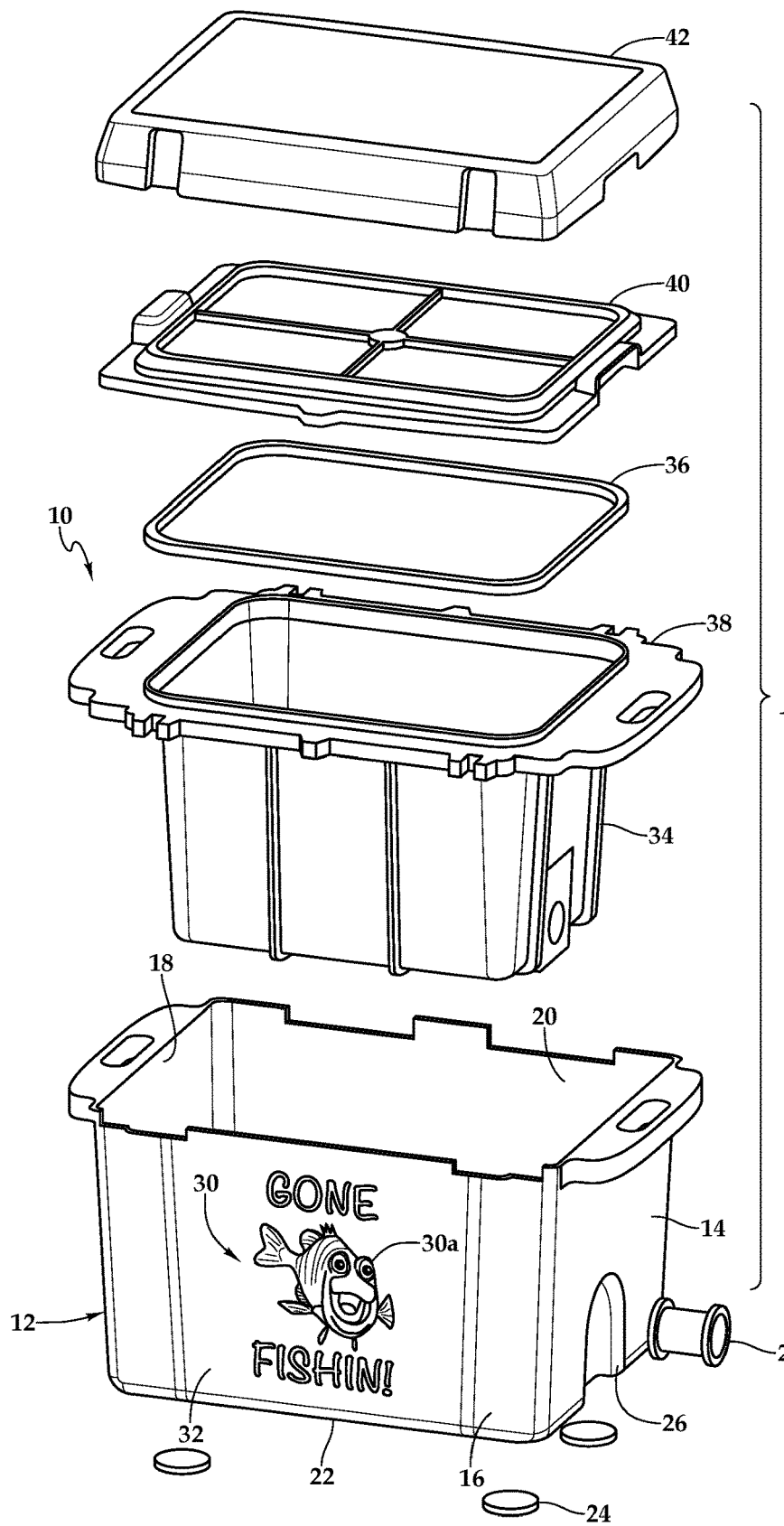
FIG. 1A is a front exploded perspective view of one embodiment of a food and beverage cooler produced by the systems and methods presented herein.

Referring initially to FIG. 1A, therein is a food and beverage cooler that is schematically illustrated and generally designated 10. A bottom shell 12 includes sidewalls 14, 16, 18, 20, and a bottom 22. Padded feet 24 support the bottom 22 and a bulkhead subassembly 26 with a spout 28 extends from sidewall 14. An image 30 is formed within a field 32 on the sidewall 16. The image 30 may include graphics, words, or a combination thereof. In one embodiment, the image 30 may be a logo or brand representing a person or entity, such as image 30A, which includes a fish logo and the words "Gone Fishing." A lower inner liner 34 is located within the bottom shell 12 and a gasket 36 is disposed along a lip 38 of the lower inner liner 34. An upper inner liner 40 is located within a top cover 42, which, during assembly, is hingedly connected to the bottom shell 12 to provide an open and closed position such that food, beverages, and other articles may be placed within the food and beverage cooler. In FIG. 1A, although the image 30 is shown on the sidewall 16 of the bottom shell 12, the image may be on any side of any component of the food and beverage cooler 10. By way of example and not by way of limitation, the image 30 may be on the sidewall 18 of the bottom shell 12 or on the top cover 42. Further, it should be appreciated that the image 30 may be on the inside or outside of the food and beverage cooler 10. Moreover, more than one image 30 may be integrated into the food and beverage cooler 10.

Figure 1B:
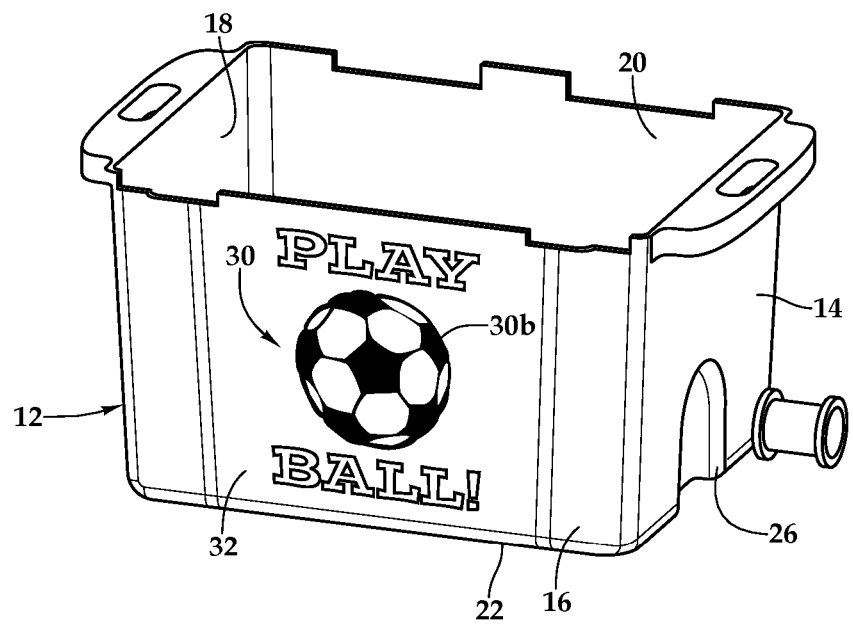
FIG. 1B is a front perspective view of one embodiment of a component of the food and beverage cooler produced by the systems and methods presented herein.

Referring now to FIG. 1B, as previously discussed, the bottom shell 12 includes the sidewalls 14, 16, 18, 20 and the bottom 22. Within the field 32, the image 30 is depicted as image 30B having a soccer ball with the words "Play Ball." As will be discussed in further detail hereinbelow, with the use of systems and methods presented herein, the injection molding run cycles that produce the components of the food and beverage cooler 10 are optimized to produce multiple production runs of a particular component or components of the food and beverage cooler 10 having different images therein within a single production cycle. Accordingly, within one injection molding run cycle, some bottom shells 12 having the image 30A therein may be produced and some bottom shells 12 having the image 30B therein may be produced. More specifically, during an injection molding operation, such as the production of food and beverage coolers 10, downtime is minimized by permitting dynamic adjustments to the molding run cycle. Further, small scale customization of product production is enabled without the need for entirely new molds.

Figure 2:
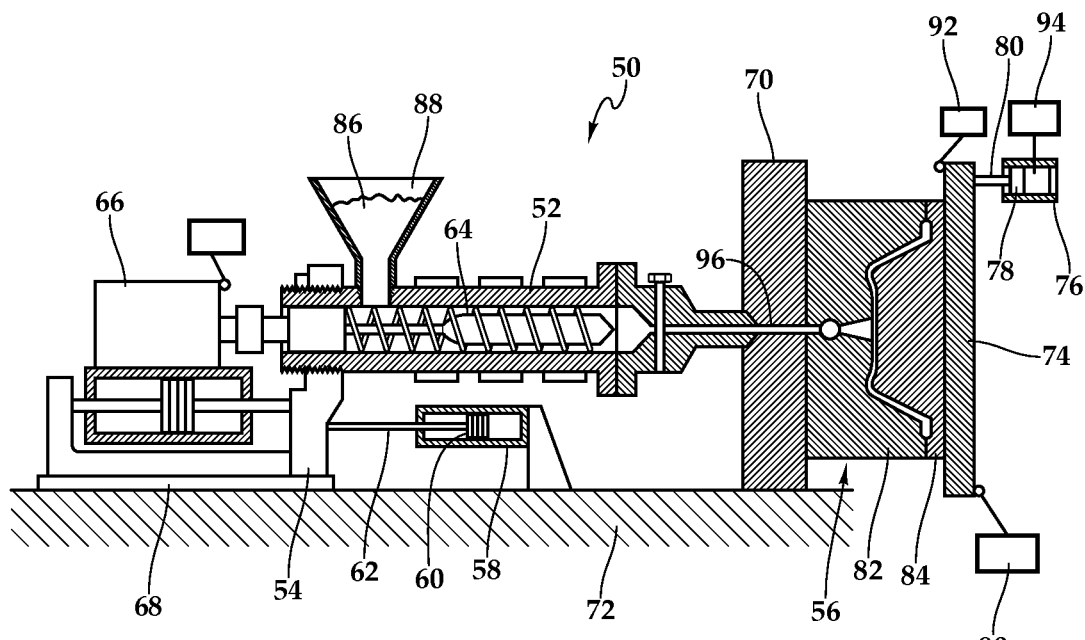
FIG. 2 is a functional schematic diagram of one embodiment of injection mold manufacturing equipment that produces the food and beverage cooler depicted in FIG. 1.

FIG. 2 illustrates an injection molding machine 50 including a plasticizing extruder having a barrel 52 mounted on a supporting cradle 54, the latter being mounted for reciprocation toward and away from a mold 56 by means of a hydraulic cylinder 58 having a piston 60 therein that is connected to the cradle 54 by a connecting rod 62. A plasticizing screw 64 is mounted within the barrel 52 and rotated by a hydraulic motor 66. A cylinder 68 is connected to the hydraulic motor 66 and serves to reciprocate the plasticizing screw 64 within the barrel 52, not only to inject plastics material into the mold 56, but also to maintain a controlled back pressure on the plasticizing screw 64 during plasticizing.

The mold 56 includes a stationary platen 70 mounted to a stationary support 72, and a movable platen 74 moved toward and away from the stationary platen 70 by a hydraulic cylinder 76 having a piston 78 therein connected to the movable platen 74 by a connecting rod 80. Primary mold halves 82 and 84 are connected to the stationary platen 70 and the movable platen 74, respectively. Thermoplastic material 86 is fed into the barrel 52 through a hopper 88. The operation of the particular injection molding machine 50 depicted in FIG. 2 may be divided into eight separate steps or sequences, including motors running, single cycle selection, clamp forward, clamp pressure, injection forward, injection low pressure, extruder run and clamp reverse.

Continuing to refer to FIG. 2, in operation, once the hydraulic motor 56 has been started and the single cycle mode, by way of example, has been selected on a controller (not shown) for the injection molding machine 50, the movable platen 74 is fully retracted so as to completely open the mold halves 82, 84 and this completely open position may be indicated by limit switch 90, for example. If a previously injection molded part, such as a component of the food and beverage cooler 10 depicted in in FIG. 1A, is present within the opened mold halves 82, 84, it is removed. At this time, the mold half 84 may be adjusted by, as will be discussed in further detail hereinbelow, insertion of an insertion block or, in another embodiment, insertion of an insertion plate. The mold half 84 may be adjusted by way of the insertion block or insertion plate to optimize the run cycles of the mold halves 82, 84 while altering the production run of the injection molded part.

By way of further explanation and example, the mold halves 82, 84 produce a component of the food and beverage cooler 10, such as the bottom shell 12 having the image 30A. By use of the insertion block or insertion plate, production of the component of the food and beverage cooler 10 may continue using the mold halves 82, 84, however, the image 30B will be integrally molded into the component of the food and beverage cooler. With the use of this system and method, the run cycles of the mold halves 82, 84 are optimized to produce multiple production runs of a component of the food and beverage cooler 10 having different images therein within a single production cycle operation of the injection molding machine 50.

Returning to FIG. 2, if no adjustment to the mold half 84 is made or following the adjustment to the mold half 84, the movable platen 74 is extended towards the stationary platen 70 by the cylinder 76 until it is fully closed, as indicated by a limit switch 92, for example. Then final clamping pressure is developed by the cylinder 76, and when this pressure level has been reached as sensed by a pressure sensitive switch 94, the charge of plasticized material built up in front of the plasticizing screw 64 is injected through a passage 96 into the primary mold halves 82, 84 by driving the plasticizing screw 64 forwardly through the action of the cylinder 68. At this time, the plasticizing screw 64 is not rotating. Following injection and during hardening of the injection molded part, such as a component of the food and beverage cooler 10 depicted in in FIG. 1, within the mold halves 82, 84, the plasticizing screw 64 is again rotated to begin building up a new charge of material, and the movable platen 74 is opened until the limit switch 90 trips. The newly produced injection molded part, such as a component of the food and beverage cooler 10 depicted in in FIG. 1, is present within the opened mold halves 82, 84, and it is removed at this time. Further, at this time, the mold half 84 may be adjusted, by, as will be discussed, in further detail hereinbelow, insertion of a insertion block or, in another embodiment, insertion of an insertion plate.

It should be appreciated that the injection molding machine 50 illustrated in FIG. 2 is intended merely to illustrate some of the basic components and operations of this type of machine, and is not intended to portray the particular commercially available machine utilized to practice the teachings presented herein. Its structures and operations have been greatly simplified in order to show the manner in which the production of customized food and beverage coolers by way of a mold may be used in connection with it, and the teachings presented herein are not limited to this particular type of injection molding machine nor to injection molding machines in general nor to the production of customized food and beverage coolers. In its broadest sense, the teachings presented herein may be utilized with a wide variety of machines in the production of various articles.

Figure 3:
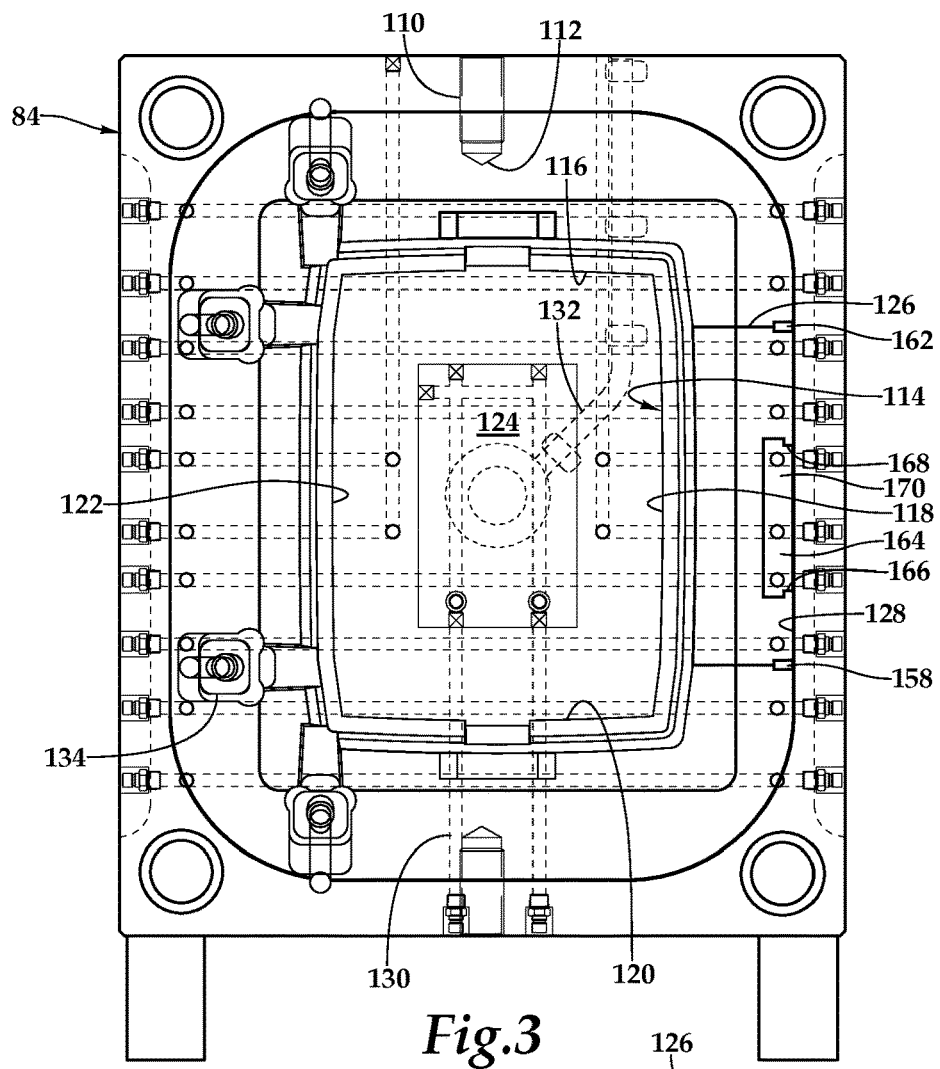
FIG. 3 is a top plan view of one embodiment of a mold configured to produce an injection molded part forming a portion of the food and beverage cooler depicted in FIG. 1.

FIG. 3 depicts the primary mold half 84, which includes various channels 110 and gates 112 that permit plastic to run therethrough to the interior of the mold half 84, which is a cavity 114 having a geometry defined by wall members 116, 118, 120, 122, and 124. An aperture 126 intersects the wall member 116 and is positioned on the wall member 116 at a location dynamically accessible during the separation of the primary mold halves 82, 84 during a production run of the injection molded part. An insertion block 128 is configured to be selectively disposed in the aperture 126 in a close fitting engagement with the wall member 116. Various hoses 130 form a continuous pathway.

In one embodiment, the wall members 116, 118, 120, 122, and 124 may correspond to the sidewalls 14, 16, 18, and 20 and bottom 22. In a similar manner, a cavity geometric form 132 corresponds to the bulkhead subassembly 26 and the spout 28. Additionally, cavity geometric form 134 corresponds to the aforementioned hinges that secure the top cover 42 to the bottom shell 12. During operation, a shot includes the amount of resin required to fill the channels and cavities of the primary mold halves 82, 84. Trapped air in the mold may escape through air vents positioned at the junction of the primary mold half 82 and the primary mold half 84. Following a shot of the thermoplastic resin 86, cooling occurs by passing a coolant, such as water, through the various hoses 130 to absorb heat from the primary mold halves 82, 84, which have absorbed heat from the thermoplastic resin 86, and keep the primary mold halves 82, 84 at a proper temperature to solidify the thermoplastic resin 86 at the most efficient rate.

Figure 4:
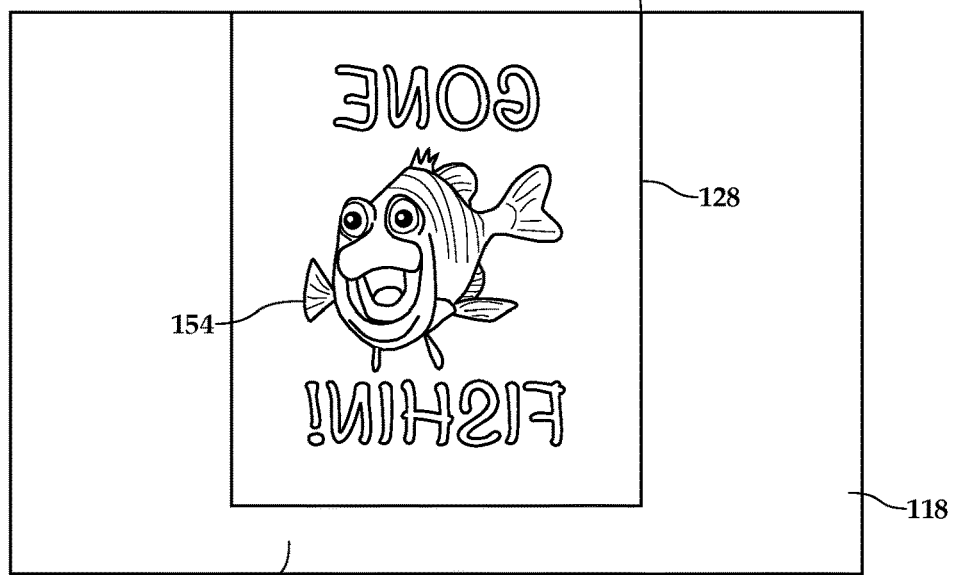
FIG. 4 is a front elevation view along line 3-3 of another embodiment of a wall member of the mold depicted in FIG. 3.
Figure 5:
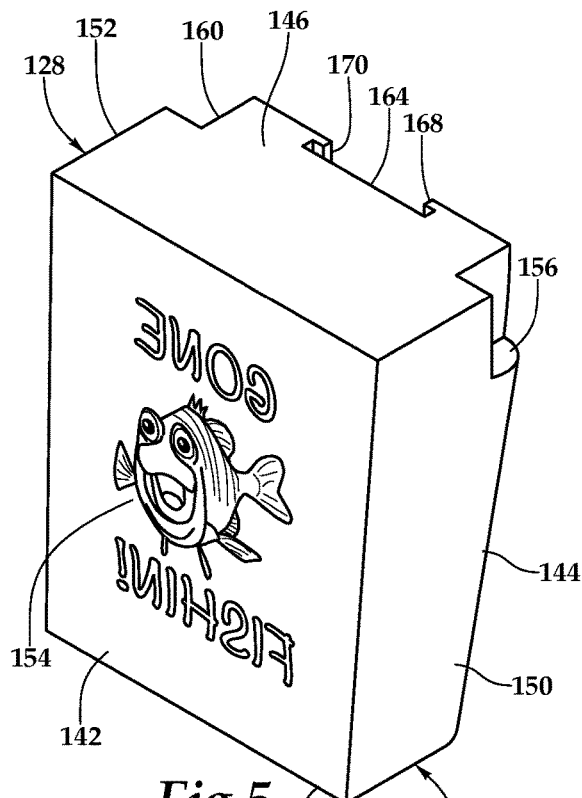
FIG. 5 is a front perspective view of one embodiment of an insertion block, which forms a portion of the wall member depicted in FIG. 4.

Referring now to FIGS. 3, 4, and 5, the wall member includes the aperture 126, which, as mentioned, is positioned on the wall member 118 at a location dynamically accessible during the separation of the primary mold halves 82, 84 during a production run of the injection molded part. As shown, the insertion block 128 is configured to be selectively disposed in the aperture 126 in a close fitting engagement with the wall member 118. The insertion block 128 includes a generally rectangular body 140 having a front 142, a rear 144, a top 146, a bottom 148, and sides 150, 152. The insertion block 128 includes a reverse image 154 on the front 142 such that molten plastic flow around the reverse image 154 produces an integrally molded image, such as image 30A or 30B, on the component of the food and beverage cooler 10. At the juncture of the rear 144, top 146, and side 150, an indentation 156 is located that is configured to mate with a fastener 158 in the form of a projection that secures the insertion block 128 to the wall member 118. Similarly, at the junction of the rear 144, top 146, and side 152, an indentation 160 is located that is also configured to mate with a fastener 162. Along the rear 144 from the top 146 to the bottom 148, a channel 164 includes inwardly facing flanges 166, 168 that mate with a track 170 to secure the insertion block 128 to the wall member 118.

Figure 6A:
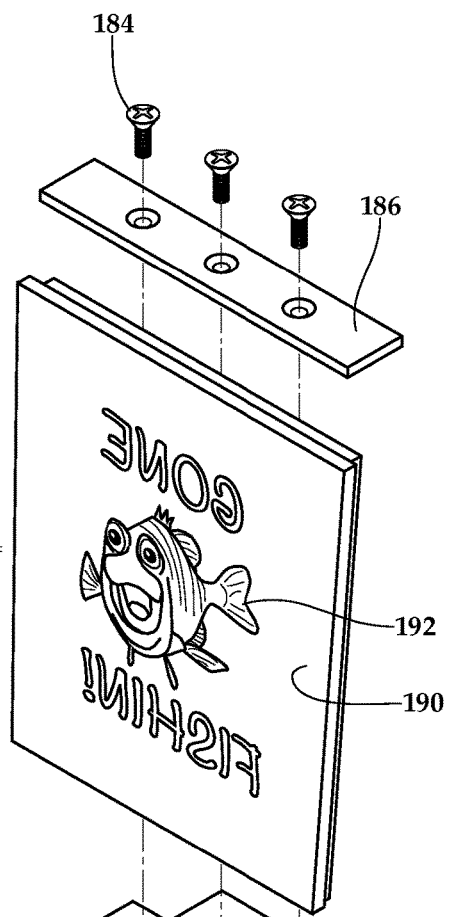
FIG. 6A is a front perspective view of the insertion block, which forms a portion of the wall member depicted in FIG. 4.
Figure 6A:
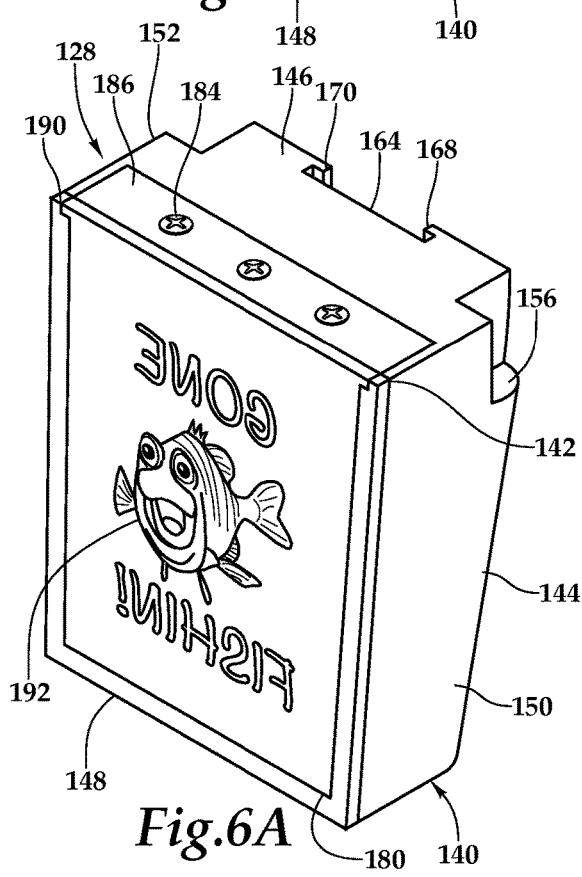
Figure 6B:
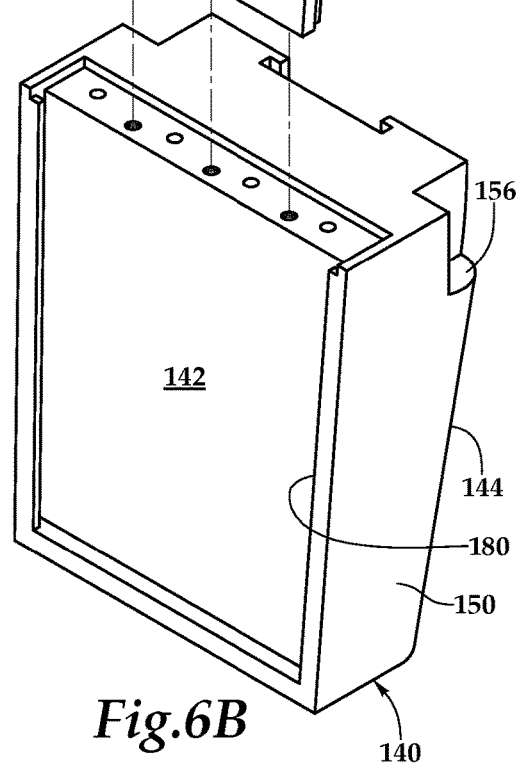
FIG. 6B is a front exploded perspective view of the insertion block depicted in FIG. 6A.

Referring to FIGS. 6A and 6B, in one embodiment, the insertion block 128 is configured to be selectively disposed in the aperture 126 in a close fitting engagement with the wall member 118. In this implementation, the insertion block 128 includes the generally rectangular body 140 having the front 142, the rear 144, the top 146, the bottom 148, and the sides 150, 152. A slot 180 is located on the front 142 of the body 140. At the front 142 and the top 146, a series of holes 182 are provided that are configured to accept fasteners 184. At the juncture of the rear 144, top 146, and side 150, an indentation 156 is located that is configured to mate with a fastener 158 in the form of a projection that secures the insertion block 128 to the wall member 118. Similarly, at the junction of the rear 144, top 146, and side 152, an indentation 160 is located that is also configured to mate with a fastener 162. Along the rear 144 from the top 146 to the bottom 148, a channel 164 includes inwardly facing flanges 166, 168 that mate with a track 170 to secure the insertion block 128 to the wall member 118. An insertion plate 190 is operable to be selectively disposed in the slot 180 in a close fitting engagement with the insertion block 128 and the wall member 118. The insertion plate 190 a reverse image 192 thereon such that molten plastic flow around the reverse image 192 produces an integrally molded image, such as image 30A or 30B, on the component of the food and beverage cooler 10. A fastener 184 and a fastening plate 186 secure the insertion plate 190 within the slot 180 and to the insertion block 128.

Figure 6C:
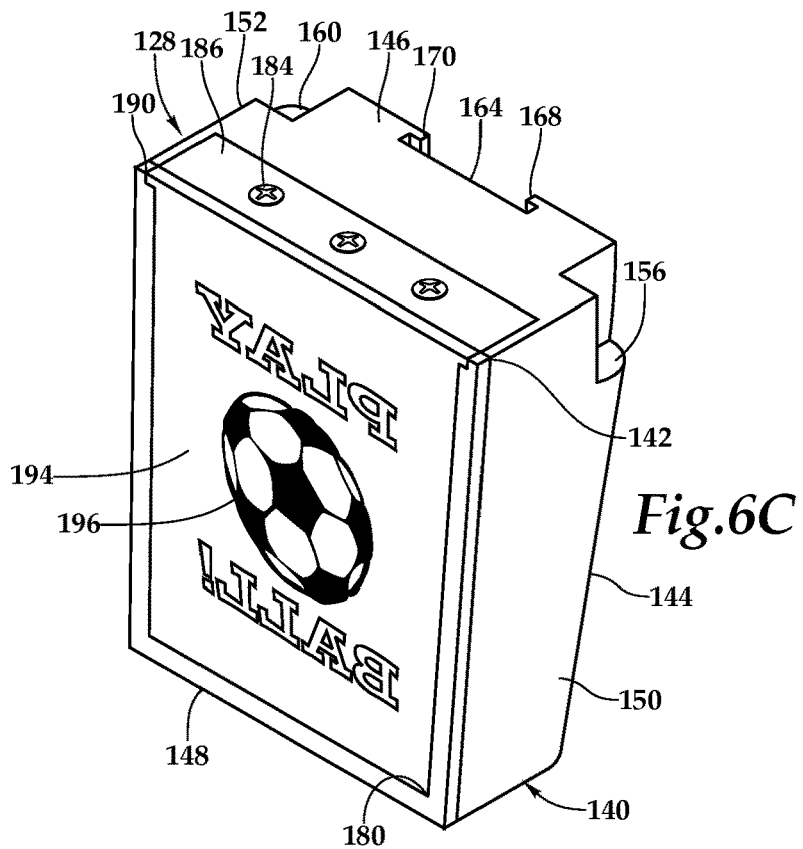
FIG. 6C is a front exploded perspective view of the insertion block depicted in FIG. 6A having an alternate reverse image thereon.

As previously discussed, with the use of this system and method, the run cycles of the mold halves 82, 84 are optimized to produce multiple production runs of a component of the food and beverage cooler 10 having different images therein within a single production cycle operation of the injection molding machine 50. In one embodiment, the different images may be obtained by changing the insertion plate 190. By way of example, with reference to FIG. 6C, the insertion block 128 includes an insertion plate 194 having a reverse image 196 thereon such that molten plastic flow around the reverse image 196 produces an integrally molded image on the component of the food and beverage cooler 10. The insertion plate 194 in FIG. 6C may be utilized instead of the insertion plate 190 in FIG. 6A or 6B with a single production cycle operation to provide a component of the food and beverage cooler 10 having a different image integrally formed thereon. As previously mentioned, similarly, insertion blocks having different reverse images may be utilized with a single production cycle operation to provide a component of the food and beverage cooler 10 having different images formed thereon.

Figure 7:
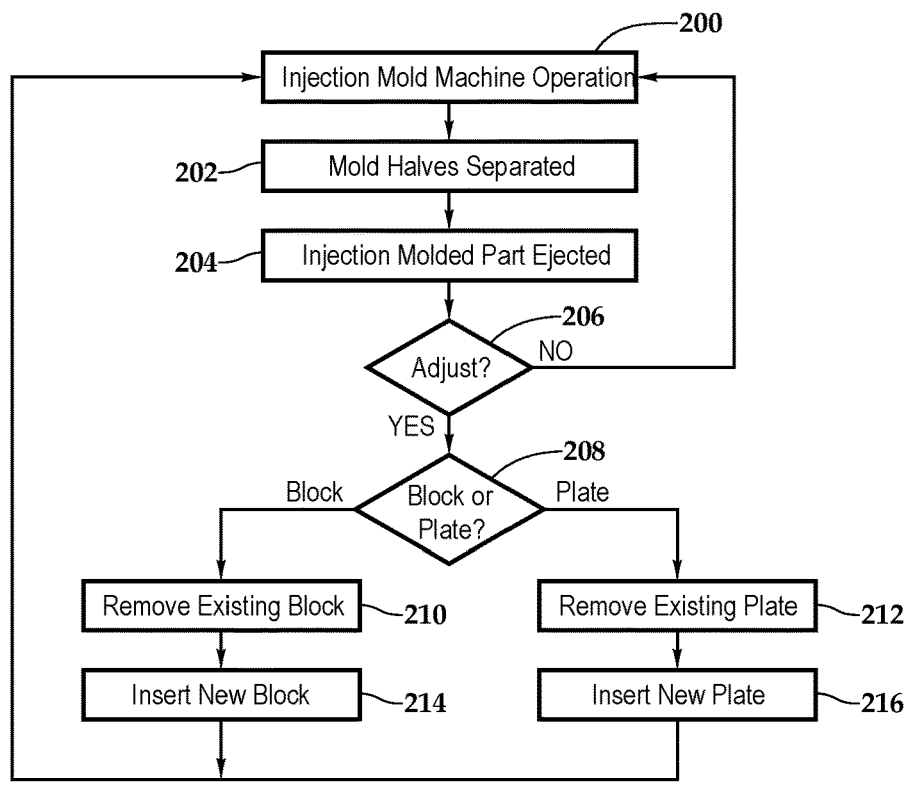
FIG. 7 is a flow chart depicting one embodiment of a method for production of a customizable food and beverage cooler.

FIG. 7 is a flow chart depicting one embodiment of a method for production of a customizable food and beverage cooler. At block 200, the injection mold machine is operating and at block 202, the movable platen is fully retracted from the stationary platen within the injection mold machine such that the primary mold halves are completely separated and in an open position. At block 204, the injection molded part is then ejected. At decision block 208, at this time, in one embodiment, the mold half associated with the movable platen may be adjusted by insertion of a different insertion block or, in another embodiment, insertion of another insertion plate. If no adjustments to the mold half are made, then the methodology returns to block 200.

On the other hand, if adjustments to the mold half are required, then the methodology advances to decision block 210. In one implementation, by adjusting the mold half by insertion of a different insertion block or insertion plate, multiple production runs of a component of the food and beverage cooler having different images therein within a single production cycle operation of the injection molding machine may be completed. This methodology and the accompanying system permit small and medium number customizable runs of the food and beverage coolers such that entire new primary mold halves are not necessary for the production.

At decision block 210, if a new insertion block is desired, then the method continues to block 212. On the other hand, if a new insertion plate is required the methodology advances to block 214. Returning to block 212, the existing insertion block is removed while the movable platen is fully retracted from the stationary platen within the injection mold machine such that the primary mold halves are completely separated and in an open position. The insertion block is positioned on within the aperture of the wall member at a location dynamically accessible during the separation of the first and second primary halves during a production run of the injection molded part. The removal of the insertion block requires minimal interaction with fasteners, bolts, and clamps. Further, it is not necessary to remove each of the bolts and/or clamps and then manually slide the mold onto the forks of a forklift truck for transporting the mold to a storage location or rack. Rather, as mentioned, the insertion block may be dynamically removed during the ejection or removal operation of the injection molded part. At block 214, the new insertion block is selectively disposed in the aperture in a close fitting engagement with the first wall member and secured thereto with a minimum number of fasteners during the ejection or removal operation of the injection molded part. Following block 214, the process returns to block 200 for further execution of the injection mold machine operation.

Returning to block 212, the existing insertion plate is removed while the movable platen is fully retracted from the stationary platen within the injection mold machine such that the primary mold halves are completely separated and in an open position. The insertion block holding the insertion plate is positioned on within the aperture of the wall member at a location dynamically accessible during the separation of the first and second primary halves during a production run of the injection molded part. The removal of the insertion plate from the slot within the insertion block requires minimal interaction with fasteners, bolts, and clamps. Further, it is not necessary to remove each of the bolts and/or clamps and then manually slide the mold onto the forks of a forklift truck for transporting the mold to a storage location or rack. Rather, as mentioned, the insertion plate may be dynamically removed during the ejection or removal operation of the injection molded part. At block 216, the new insertion plate is selectively disposed in the slot in a close fitting engagement with the insertion block and the wall member and secured thereto with a minimum number of fasteners during the ejection or removal operation of the injection molded part. Following block 216, the process returns to block 200 for further execution of the injection mold machine operation.

As will be appreciated, the wall member injection mold run cycles are substantially greater than or equal to the insertion block run cycles. As will further be appreciated, the wall member injection mold run cycles are substantially greater than the insertion block run cycles corresponding to the plurality of insertion plates. Also, the insertion block run cycles are substantially greater than each of the insertion plate run cycles corresponding to the plurality of insertion plates. More specifically, in one embodiment, the wall member injection mold run cycles are from about 800,000 to about 1.2 million; the insertion block run cycles are from about 800,000 to about 1.2 million; and the insertion plate run cycles are from about 15,000 to about 25,000. The mold half, including the wall member may weigh about 4,000 pounds to about 6,000 pounds and include tool steel. The insertion block may weigh about 700 pounds to about 800 pounds and include tool steel. The insertion plate may weigh about 40 pounds to about 70 pounds and include tool steel or aluminum, depending on the desired number of impressions.

Customizable, small scale production of food and beverage coolers having unique images, such as logos and words, is possible in one implementation as a production run set of insertion blocks may be selected and appropriately paired with a production run set of insertion plates such that the cumulative insertion plate run cycles of the production run set of insertion plates approximate the cumulative insertion block run cycles of the production run set of insertion blocks, which approximate the wall member injection mold run cycles. In this manner, it is not necessary to manufacture mold halves for a small run of custom food and beverage coolers. Rather, it is necessary to custom manufacture only an insertion block or an insertion plate, depending on the desired number of food and beverage coolers.

The order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for production of a customizable food and beverage cooler, the system comprising:

a mold including first and second primary halves configured to produce an injection molded part, the injection molded part being a component of the food and beverage cooler;

the second primary half of the mold first, second, third, fourth, and fifth wall members;

an aperture intersecting the first wall member, the aperture being positioned on the first wall member at a location dynamically accessible during the separation of the first and second primary mold halves during a production run of the injection molded part;

a first insertion block being a first rectangular body having a first front, a first rear, a first top, a first bottom, first right side, and first left side, the first insertion block operable to be selectively disposed in the aperture in a fitted engagement with the first wall member, the first insertion block including a first reverse image thereon at the first front such that molten plastic flow around the first reverse image produces an integrally molded first image on the component of the food and beverage cooler, the first insertion block including a first fastener at a first junction of the first top and first rear to secure the first insertion block to the first wall member of the second primary half of the mold, the first fastener including a first indentation configured to mate with a projection on the first wall member of the second primary mold half, the first insertion block including a first channel at the first rear from the first top to the first bottom, the first channel having inwardly facing first flanges, the first channel mating with a track at the first wall member of the second primary half of the mold;

a second insertion block being a second rectangular body having a second front, a second rear, a second top, a second bottom, a second right side, and a second left side, the second insertion block operable to be selectively disposed in the aperture in a fitted engagement with the first wall member, the second insertion block including a second fastener at a second junction of the second top and second rear to secure the second insertion block to the first wall member of the second primary half of the mold, the second fastener including a second indentation configured to mate with the projection on the first wall member of the second primary mold half, the second insertion block including a slot at the second front, the second insertion block including a second channel at the second rear from the second top to the second bottom, the second channel having inwardly facing second flanges, the second channel mating with the track at the first wall member of the second primary half of the mold;

a first insertion plate operable to be selectively disposed in the slot of the second insertion block in a fitted engagement with the second insertion block and the first wall member of the second primary half of the mold, the first insertion plate being integral and spanning the second front of the second insertion block from the second top to the second bottom and from the second right side to the second left side, the first insertion plate including a second reverse image thereon such that molten plastic flow around the second reverse image produces an integrally molded second image on the component of the food and beverage cooler;

the second insertion block including a third fastener at a third junction of the second top and second front to secure the first insertion plate within the slot; and one of the first insertion block and a combination of the second insertion block and the first insertion plate being disposed in the aperture based on the production run of the injection molded part during an ejection operation of the injection molded part.

2. The system as recited in claim 1, wherein the component further comprises a constituent selected from the group consisting of a bottom shell and a top cover.

3. The system as recited in claim 1, wherein molten plastic flow around the first wall member produces an integrally molded sidewall of a bottom shell.

4. The system as recited in claim 1, wherein the first reverse image and the second reverse image are identical.

5. The system as recited in claim 1, further comprising a second insertion plate operable to be selectively disposed in the slot in a fitted engagement with the second insertion block and the first wall member, the second insertion plate including a third reverse image thereon such that molten plastic flow around the third reverse image produces an integrally molded third image on the component of the food and beverage cooler.

6. The system as recited in claim 1, wherein the first wall member injection mold further comprises run cycles from about 800,000 to about 1.2 million.

7. The system as recited in claim 1, wherein the first insertion block further comprises run cycles from about 800,000 to about 1.2 million.

8. The system as recited in claim 1, wherein the first insertion plate further comprises run cycles from about 15,000 to about 25,000.

9. The system as recited in claim 1, wherein the first wall member injection mold further comprises run cycles from about 800,000 to about 1.2 million, the first insertion block further comprises run cycles from about 800,000 to about 1.2 million, and the first insertion plate further comprises run cycles from about 15,000 to about 25,000.

10. A system for production of a customizable food and beverage cooler, the system comprising:

a mold including first and second primary halves configured to produce an injection molded part, the mold including tool steel;

the injection molded part being a component of the food and beverage cooler, the component selected from the group consisting of bottom shells and top covers;

the second primary half of the mold first, second, third, fourth, and fifth wall members;

an aperture intersecting the first wall member, the aperture being positioned on the first wall member at a location dynamically accessible during the separation of the first and second primary mold halves during a production run of the injection molded part;

an insertion block being a rectangular body having a front, a rear, a top, a bottom, first side, and second side, the first insertion block operable to be selectively disposed in the aperture in a fitted engagement with the first wall member, the insertion block including a slot, the insertion block including a first fastener at a junction of the top and rear to secure the insertion block to the first wall member, the first fastener including an indentation configured to mate with a projection, the insertion block including a channel at the rear from the top to the bottom, the channel having inwardly facing flanges, the channel mating with a track at the first wall member;

a plurality of insertion plates each operable to be selectively disposed in the slot in a fitted engagement with the insertion block and the first wall member, each of the plurality of insertion plates being integral and spanning the front of the insertion block from the top to the bottom and from the first side to the second side, each of the insertion plates including a reverse image thereon such that molten plastic flow around the reverse image produces an integrally molded image on the component of the food and beverage cooler; and the insertion block including a second fastener at the junction of the top and front to secure one of the plurality of insertion plates within the slot.

11. The system as recited in claim 10, wherein the first wall member injection mold further comprises run cycles from about 800,000 to about 1.2 million.

12. The system as recited in claim 10, wherein the insertion block further comprises run cycles from about 800,000 to about 1.2 million.

13. The system as recited in claim 10, wherein each of the insertion plate further comprises run cycles from about 15,000 to about 25,000.

14. The system as recited in claim 10, wherein the first wall member injection mold further comprises run cycles from about 800,000 to about 1.2 million, the first insertion block further comprises run cycles from about 800,000 to about 1.2 million, and the first insertion plate further comprises run cycles from about 15,000 to about 25,000.

15. A system for production of a customizable food and beverage cooler, the system comprising:

a mold including first and second primary halves configured to produce an injection molded part, the mold including tool steel;

the injection molded part being a component of the food and beverage cooler, the component selected from the group consisting of bottom shells and top covers;

the second primary half of the mold first, second, third, fourth, and fifth wall members;

an aperture intersecting the first wall member, the aperture being positioned on the first wall member at a location dynamically accessible during the separation of the first and second primary mold halves during a production run of the injection molded part;

a plurality of insertion blocks being a rectangular body having a front, a rear, a top, a bottom, first side, and second side, the first insertion block each operable to be selectively disposed in the aperture in a fitted engagement with the first wall member, each of the plurality of insertion blocks including a first fastener at a junction of the top and rear to secure the respective insertion block to the first wall member, each of the plurality of insertions block including a respective slot at the front, each of the plurality of insertion blocks including a first fastener at a junction of the top and rear to secure the insertion block to the first wall member, the first fastener including an indentation configured to mate with a projection, the insertion block including a channel at the rear from the top to the bottom, the channel having inwardly facing flanges, the channel mating with a track at the first wall member;

a plurality of insertion plates each operable to be selectively disposed in the slot in a fitted engagement with one of the insertion blocks and the first wall member, each of the plurality of insertion plates being integral and spanning the front of one of the plurality of insertion blocks from the top to the bottom and from the first side to the second side, each of the plurality of insertion plates including a reverse image thereon such that molten plastic flow around the reverse image produces an integrally molded image on the component of the food and beverage cooler; and each of the plurality of insertion blocks including a second fastener at the junction of the top and front to secure the insertion plate within the slot.

16. The system as recited in claim 15, wherein the first wall member injection mold further comprises run cycles from about 800,000 to about 1.2 million.

17. The system as recited in claim 15, wherein each of the plurality of insertion block further comprises run cycles from about 800,000 to about 1.2 million.

18. The system as recited in claim 15, wherein each of the insertion plate further comprises run cycles from about 15,000 to about 25,000.

19. The system as recited in claim 15, wherein the first wall member injection mold further comprises run cycles from about 800,000 to about 1.2 million, the first insertion block further comprises run cycles from about 800,000 to about 1.2 million, and the first insertion plate further comprises run cycles from about 15,000 to about 25,000.

* * * * *